United States Patent
Ureshino et al.

(10) Patent No.: US 6,318,950 B1
(45) Date of Patent: *Nov. 20, 2001

(54) UNLOADER FOR TIRE VULCANIZER (75) Inventors: Kashiro Ureshino; Hiroyuki Takebayashi; Hisaaki Onishi; Hisashi Mitamura, all of Takasago (JP)

(73) Assignee: Kabushiki Kaisha Kobe Seiko Sho, Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/756,405

(22) Filed: Nov. 27, 1996

(30) Foreign Application Priority Data

Nov. 28, 1995 (JP) .................................... 7-333900

(51) Int. Cl.⁷ .................................................. B66C 23/00
(52) U.S. Cl. .................... 414/744.3; 187/410; 198/468.2
(58) Field of Search .............................. 414/751, 744.3, 414/744.4, 744.5; 198/468.2; 187/410, 406; 384/43, 45; 425/38

(56) References Cited

U.S. PATENT DOCUMENTS

| | | | |
|---|---|---|---|
| 2,998,887 | * 9/1961 | Sommer | 414/744.4 |
| 3,031,906 | * 5/1962 | Holman | 414/744.5 X |
| 3,918,861 | 11/1975 | Klose . | |
| 4,504,186 | * 3/1985 | Richards | 414/744.3 |
| 4,572,590 | * 2/1986 | Teramachi | 384/45 |
| 4,619,575 | * 10/1986 | Summa et al. | 414/280 |
| 4,620,831 | * 11/1986 | Poncet et al. | 901/23 X |
| 4,681,521 | 7/1987 | Grotkasten . | |
| 4,797,061 | * 1/1989 | Munakata | 901/15 X |
| 4,968,155 | * 11/1990 | Bode | 384/45 |
| 5,100,284 | * 3/1992 | Boisseau | 414/744.3 |
| 5,375,964 | * 12/1994 | Dudzik | 414/744.3 |
| 5,641,521 | 6/1997 | Sarumaru . | |

FOREIGN PATENT DOCUMENTS

| | | |
|---|---|---|
| 25 43 426 | 4/1976 | (DE) . |
| 34 43 947 | 6/1986 | (DE) . |
| 0 099 326 | 1/1984 | (EP) . |
| 4-146104 | 5/1992 | (JP) . |

* cited by examiner

Primary Examiner—Donald W. Underwood
(74) Attorney, Agent, or Firm—Oblon, Spivak, McClelland, Maier & Neustadt, P.C.

(57) ABSTRACT

An unloader for a tire vulcanizer includes a linear motion guide rail fixed vertically to a main frame of a tire vulcanizer; a slider movably engaged with the linear motion guide rail; a movable carriage having the slider so as to elevate along the linear motion guide rail; a revolving suspension member which is attached to the movable carriage and has revolving rods vertically supported by bearings; and a chuck boom which is provided to the revolving rods so as to be turnable in the horizontal direction and supports the chuck mechanism.

4 Claims, 12 Drawing Sheets

UNLOADER FOR TIRE VULCANIZER

BACKGROUND OF THE INVENTION

1. Field of the Invention

The present invention relates to an unloader for a tire vulcanizer, which conveys a vulcanized tire from a tire vulcanizer to a post-cure inflator.

2. Related Background Art

Hitherto, when vulcanization molding of a green tire is completed in a tire vulcanizer, the vulcanized tire is dropped from an elevated spot and is moved to a post-cure inflator (hereinlater, abbreviated to a PCI) via an inclined conveyer by using self weight. After that, the vulcanized tire is contacted with a stopper of the PCI, thereby positioning the vulcanized tire to the center of the PCI.

According to the above method, however, the vulcanized tire and the center of the PCI are not positioned with high accuracy and the quality of the tire is lowered. In recent years, the vulcanized tire is moved from the tire vulcanizer to the PCI by an unloader for the tire vulcanizer.

Figure 10:
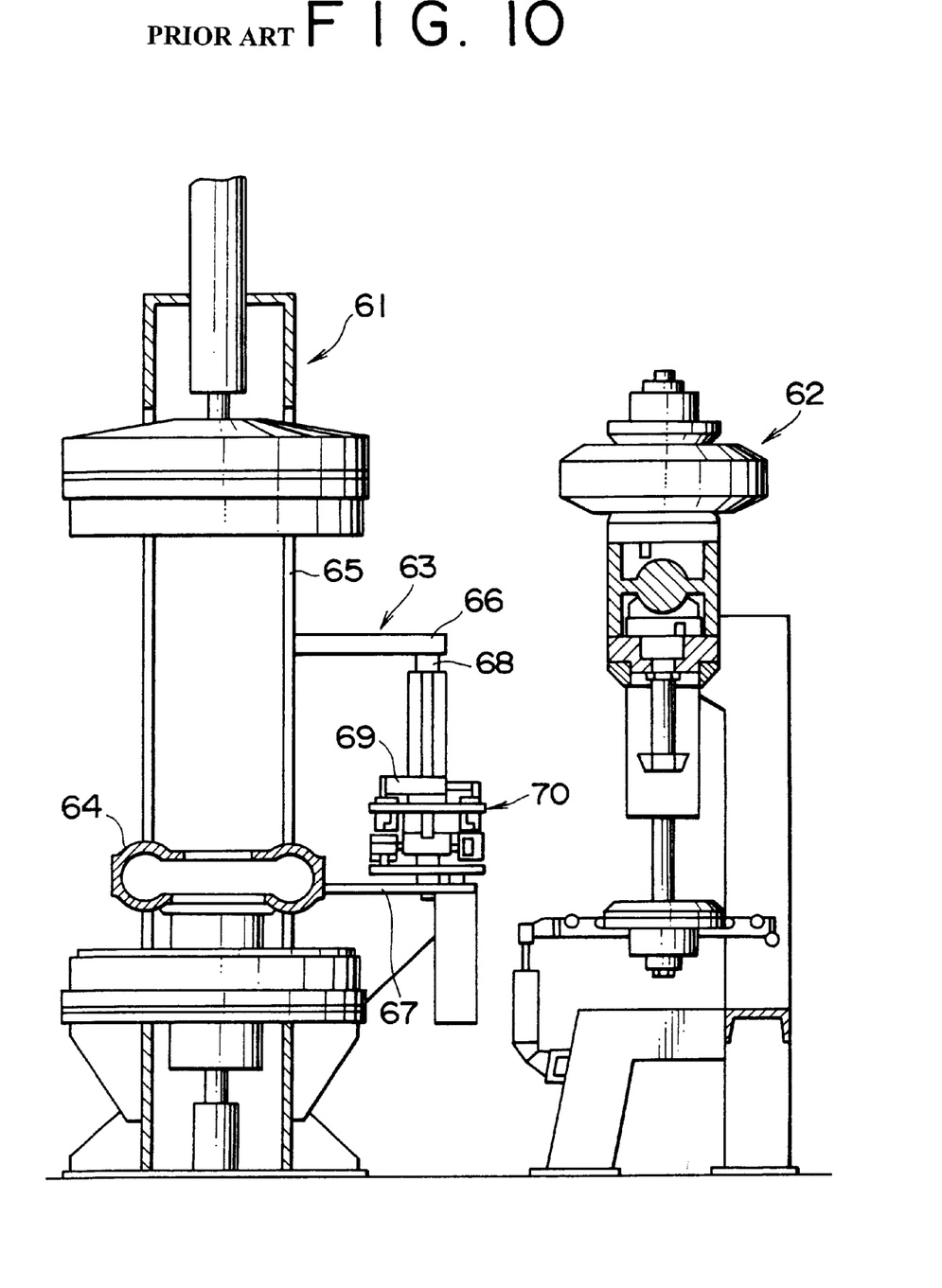
FIG. 10 is a schematic side view of the conventional unloader for the tire vulcanizer.
Figure 11:
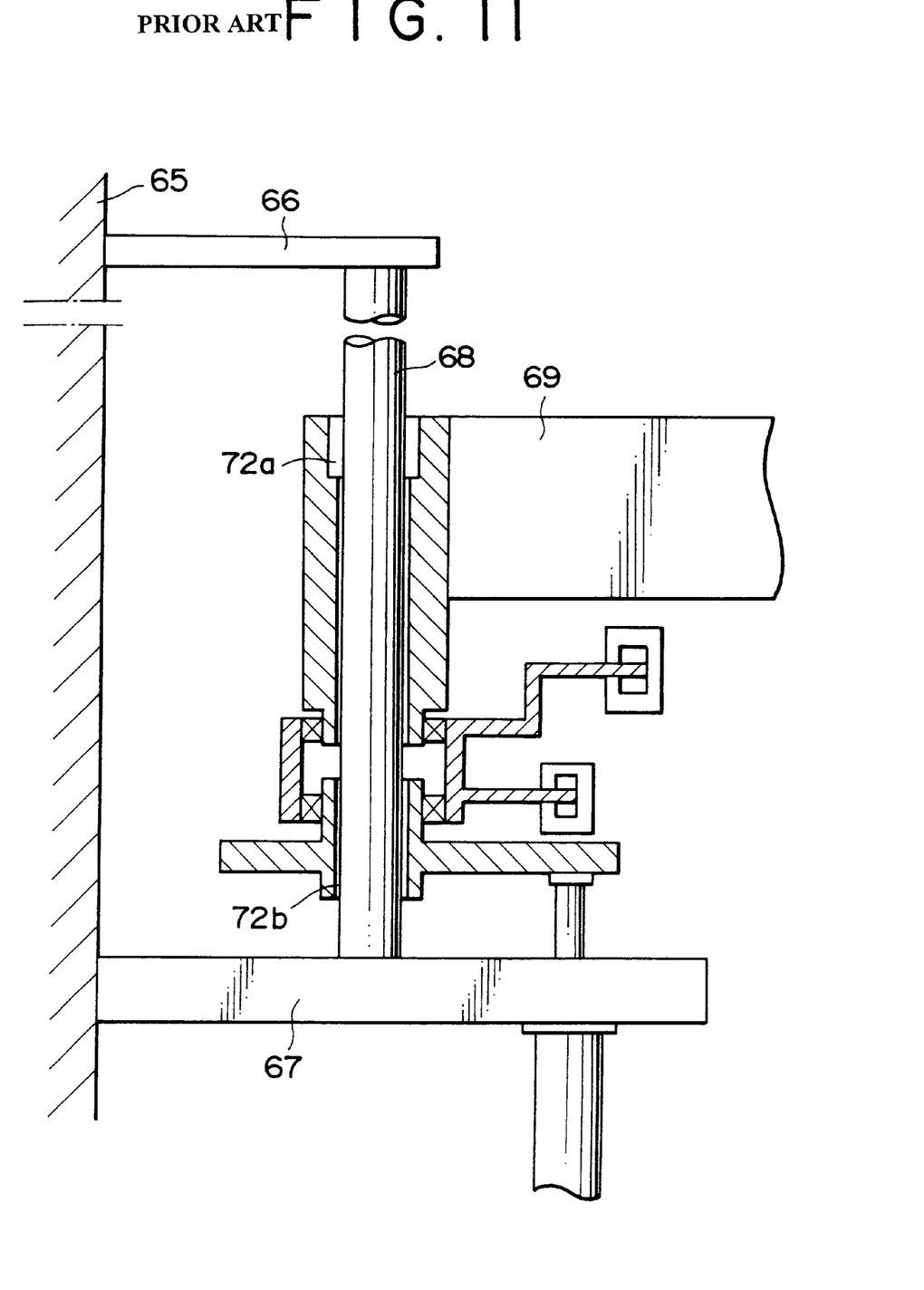
FIG. 11 is a schematic diagram of the conventional unloader for the tire vulcanizer.

The unloader (Japanese Patent Application Publication No. 3-67006) for a tire vulcanizer has a construction as shown in FIGS. 10 and 11. A guide rod 68 is vertically provided to a main frame 65 of a tire vulcanizer 61 via supporting members 66 and 67. A chuck boom 69 is provided to the guide rod 68 via bushings 72a and 72b so as to vertically and rotatably move. A chuck mechanism 70 is capable of holding a vulcanized tire 64 at the end of the chuck boom 69. According to the above construction, the vulcanized tire 64 can be conveyed from the tire vulcanizer 61 to a predetermined position of a PCI 62 by a turn around the guide rod 68 and linear motion along the guide rod 68. Therefore, by attaching the guide rod 68 with high precision, the vulcanized tire 64 can be positioned to the PCI 62 with high precision.

Figure 12:
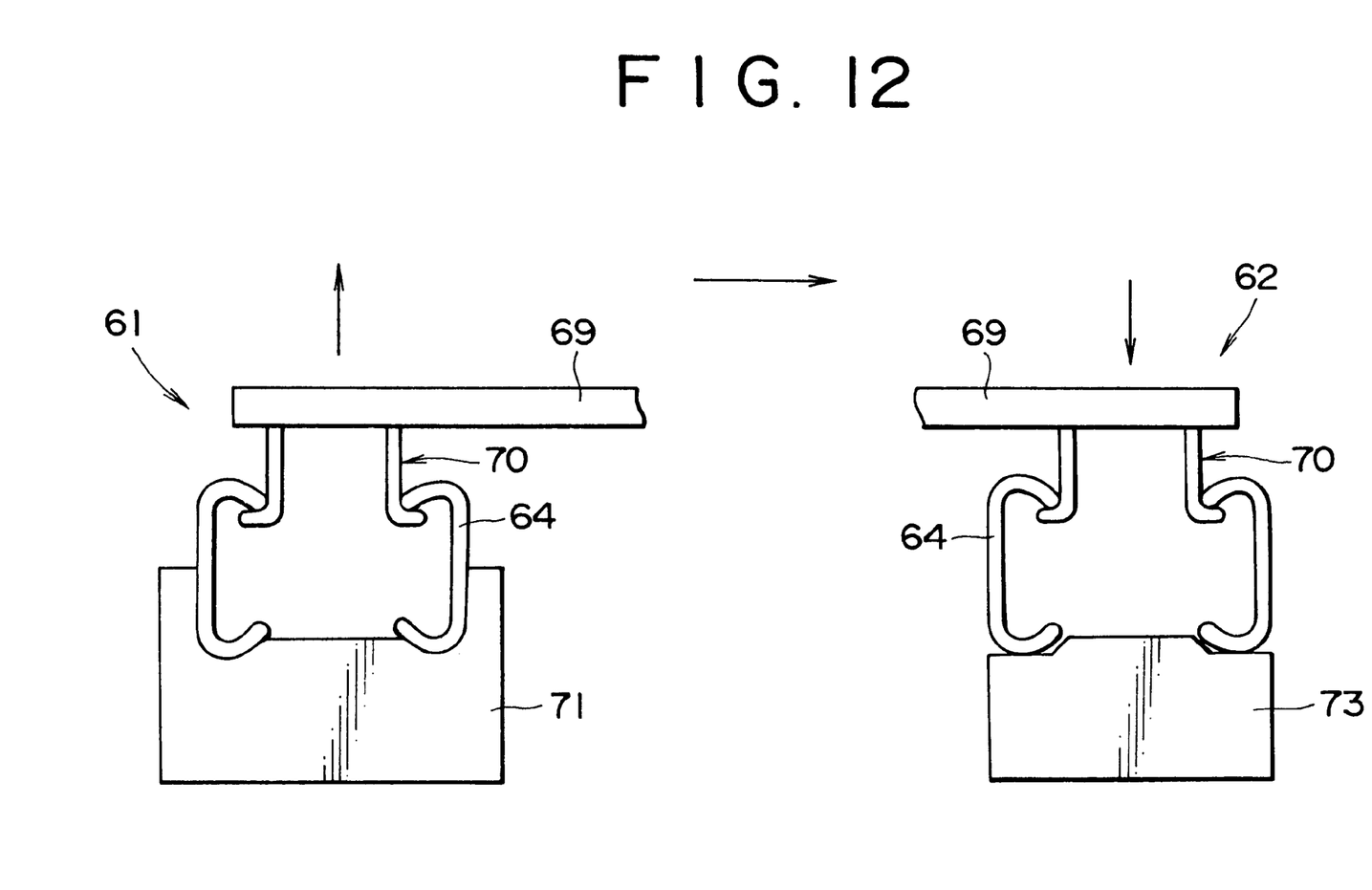
FIG. 12 is a diagram for showing a state where a vulcanized tire is conveyed by the unloader for the tire vulcanizer.

As shown in FIG. 12, in order to obtain a high-quality tire, the unloader for the tire vulcanizer is required to put the vulcanized tire 64 on a bottom rim 73 of the PCI 62 while positioning the tire 64 so as not to be deviated or inclined. In this instance, deviation and inclination of the vulcanized tire 64 for on the bottom rim 73 occurs since a chuck mechanism 70 is deviated and inclined relative to the vulcanized tire 64 when the chuck mechanism 70 holds the vulcanized tire 64 and separates the tire 64 from a mold 71. Therefore, the unloader for the tire vulcanizer is required to have high rigidity so that the chuck mechanism 70 can be accurately positioned and the vulcanized tire 64 is not deviated and inclined by a force which is applied when the vulcanized tire 64 is separated from the mold 71. Especially, when the unloader for the tire vulcanizer is operated at high speed in view of productivity, very high rigidity is required for the unloader for the tire vulcanizer.

However, as the above unloader for the tire vulcanizer, in the construction where the guide rod 68 supports the chuck mechanism 70 via the chuck boom 69, when the vulcanized tire 64 is separated from the mold 71, the guide rod 68 is deflected. There is, consequently, a problem in recent years that the rigidity corresponding to the higher quality of the tire and the improvement of the productivity cannot be obtained. There is another problem that the space between the main frame 65 and the PCI 62 is large by an amount corresponding to the space between the guide rod 68 and the main frame 65, thereby causing a large size of the whole tire vulcanizer.

Further, as the above unloader for the tire vulcanizer, in the construction where the bushings 72a and 72b are fit into the guide rod 68, clearance between the guide 68 and the bushings 72a and 72b is increased with time by abrasion of the bushings 72a and 72b, thereby causing a problem that the positioning accuracy of the chuck mechanism 70 quickly deteriorates.

According to the invention, there is provided an unloader for the tire vulcanizer in which the positioning accuracy of the chuck mechanism 70 can be improved by the high rigidity and can be maintained for a long time, and the whole tire vulcanizer can be miniaturized.

In order to achieve the objects, according to the invention, by vertically and horizontally moving a chuck mechanism, a vulcanized tire is conveyed from a tire vulcanizer to a post-cure inflator while being held by the chuck mechanism and is positioned to a predetermined position in the post-cure inflator.

According to the invention, there is provided an unloader for a tire vulcanizer, comprising: a linear motion guide rail which is vertically fixed to a main frame of the tire vulcanizer and has a plurality of raceway grooves; a slider in which balls rolling on the raceway grooves of the linear motion guide rail are assembled and is movably engaged with the linear motion guide rail; a movable carriage having the slider so as to elevate along the linear motion guide rail; a revolving suspension member which is provided on the movable carriage and has a revolving rod vertically supported by bearings; and a chuck boom which is provided to the revolving rod so as to be turnable in the horizontal direction and supports the chuck mechanism.

According to the invention, the chuck boom can be also fixed at a position between the tire vulcanizer and the post-cure inflator.

According to the invention, a revolving arm can be coupled to the chuck boom via the supporting rod and the revolving arm is pushed and pulled by an actuator for turning which is provided on the movable carriage, thereby turning the chuck boom.

The turn of the chuck boom can be adjusted by an amount of a horizontal movement of the actuator for turning for the movable carriage and/or a stroke amount of the actuator for turning.

According to the construction, the linear motion guide rail is fixed to the main frame and has consequently high rigidity. Even when the chuck mechanism is elevated and a large force is applied from the slider to deflect the linear motion guide rail, the linear motion guide rail is hardly deflected. No clearance occurs between the linear motion guide rail and the slider. Since the revolving rod for revolving the chuck boom is supported by bearings, the clearance between the revolving rod and the bearing is extremely small.

Therefore, the inclination of the chuck mechanism and the chuck boom due to the deflection and clearance is extremely reduced and the vulcanized tire can be loaded with high positioning accuracy. Since the coefficient of friction of the bearing is very small, the clearance between the revolving rod and the bearings is not increased by abrasion. The high positioning accuracy can be maintained for a long time.

Further, since the linear motion guide rail is fixed to the main frame and no space exists between the linear motion guide rail and the main frame, the interval between the main frame and the post-cure inflator is reduced and the whole tire vulcanizer can be miniaturized.

Since the chuck boom and the chuck mechanism can be fixed in a position between the tire vulcanizer and the post-cure inflator, the maintenance, check and the exchanging work of the mold can be easily performed.

Since one elevating base has two right and left elevating mechanisms and the revolving mechanisms, the unloader for the tire vulcanizer can be compactly constructed.

According to the invention, the revolving of the chuck boom can be easily adjusted by changing the moving amount in the horizontal direction of the actuator for the movable carriage and/or the stroke amount of the actuator.

DETAILED DESCRIPTION OF THE PREFERRED EMBODIMENT

An embodiment of the invention will be described with reference to FIGS. 1 to 9.

Figure 1:
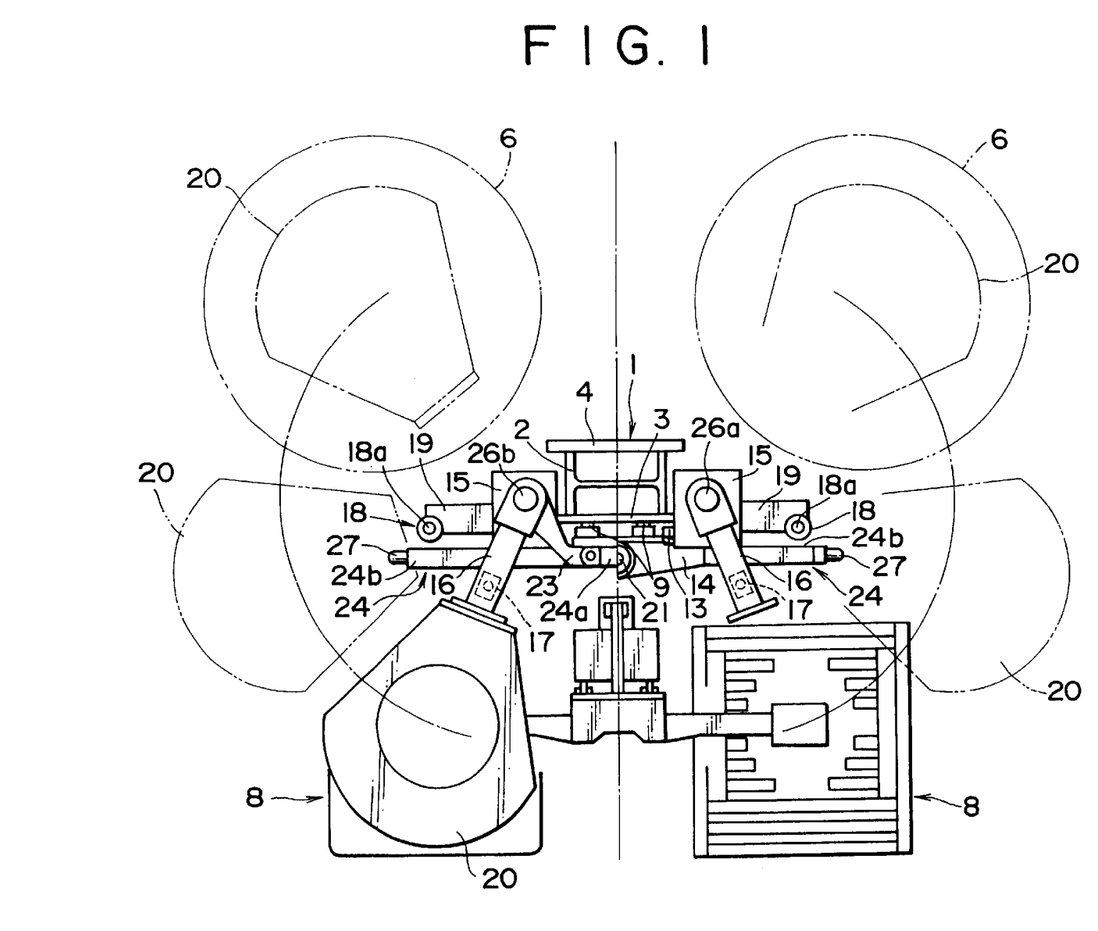
FIG. 1 is a schematic plan view of an unloader for a tire vulcanizer.
Figure 2:
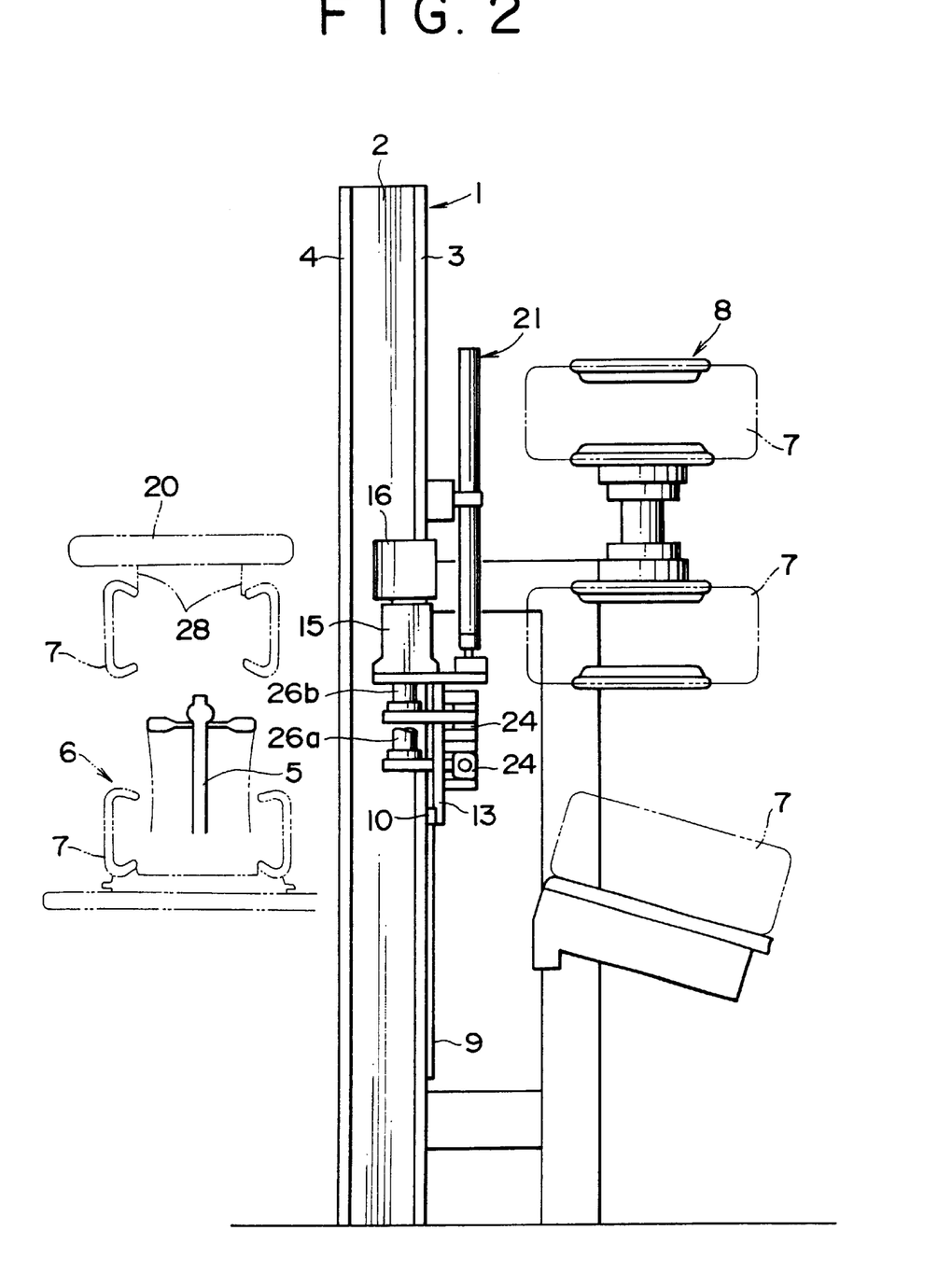
FIG. 2 is a schematic side view of the unloader for the tire vulcanizer.

An unloader for a tire vulcanizer according to the embodiment is provided in a main frame 1 of the tire vulcanizer as shown in FIGS. 1 and 2. The main frame 1 is formed in a prism shape by joining plate-shaped members 3 and 4 on both sides of a center material 2 so as to have high rigidity. A pair of vulcanizing molding units 6, 6 of the tire vulcanizer each having a center mechanism 5, a mold (not shown), and the like are provided on the right and left sides of the plate-shaped member 4 of the main frame 1.

Figure 3:
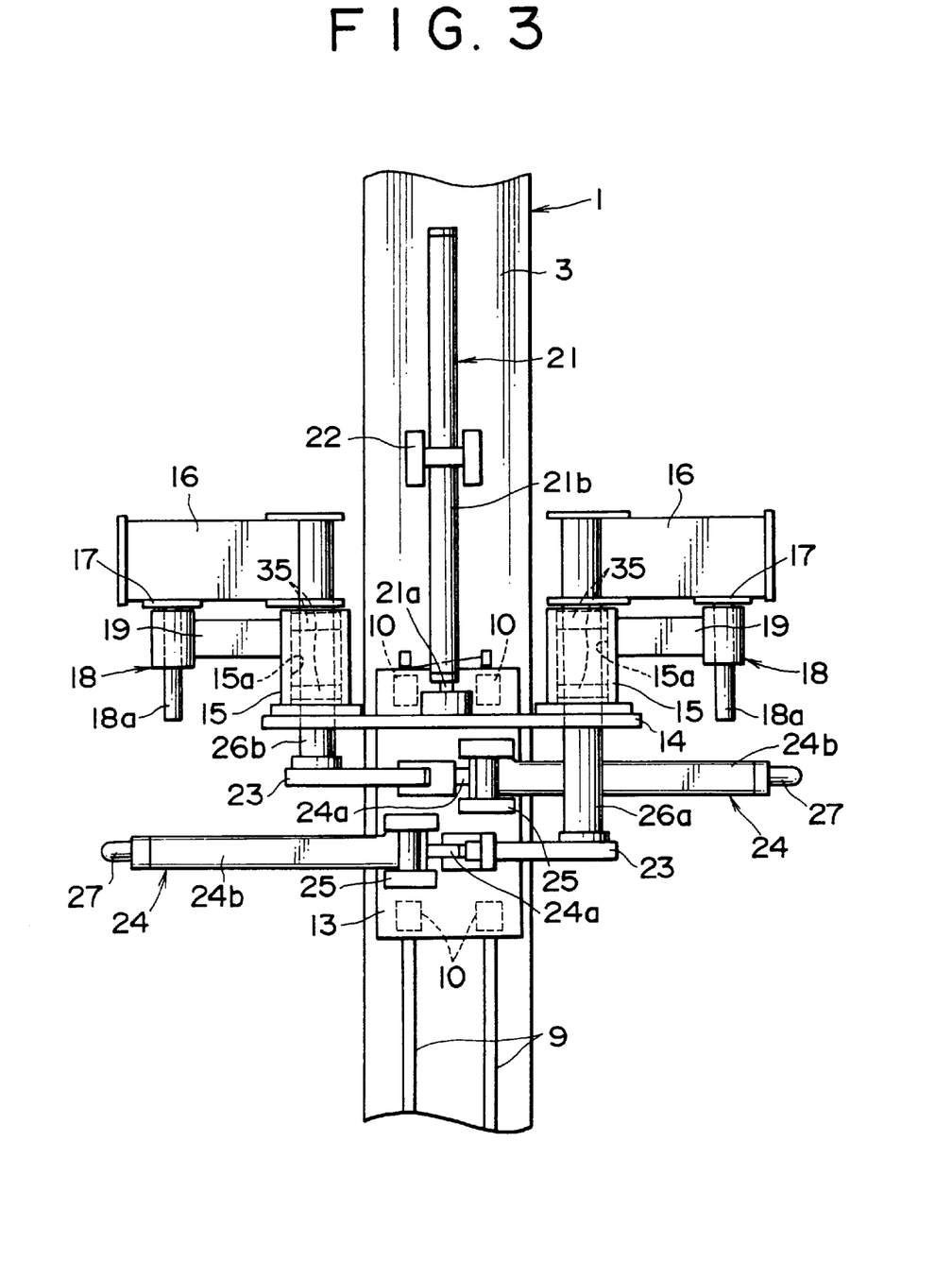
FIG. 3 is a schematic front view of the unloader for the tire vulcanizer.
Figure 4:
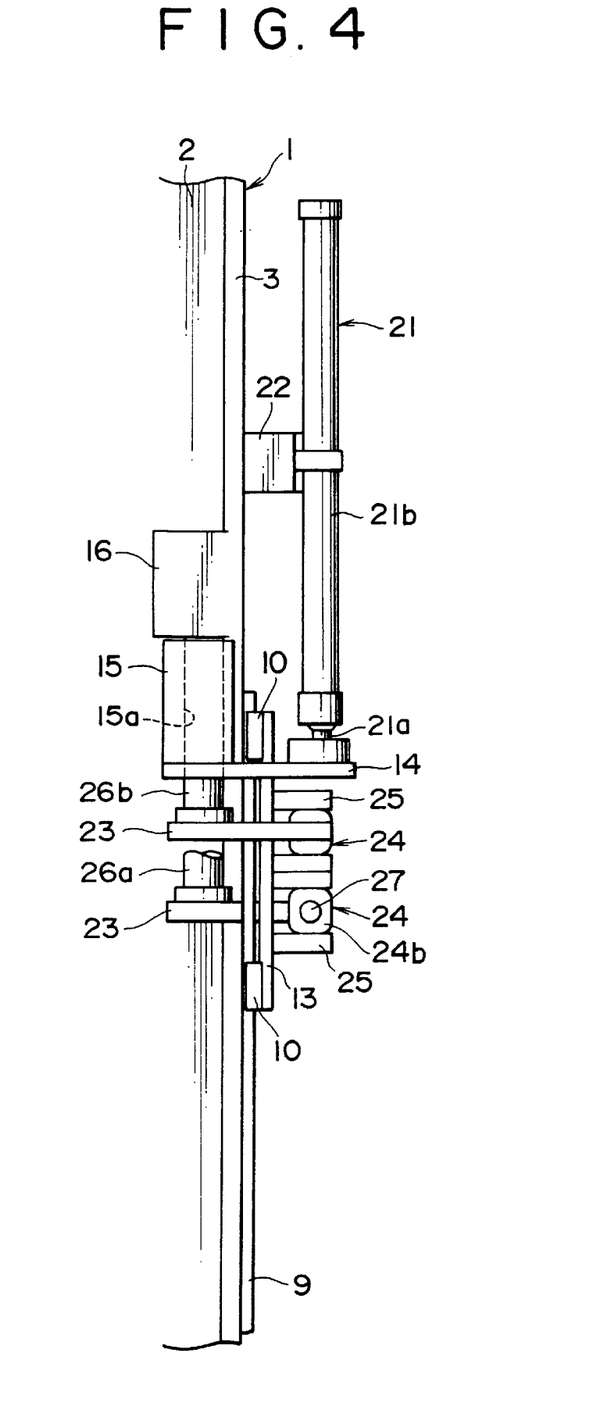
FIG. 4 is a schematic side view of the unloader for the tire vulcanizer.

PCIs 8, 8 for air-cooling a vulcanized tire 7 are arranged on the right and left sides on the other side of the main frame 1. In the plate-shape member 3 in the main frame 1 positioning on the PCIs 8, 8 side, as shown in FIGS. 3 and 4, linear motion guide rails 9, 9 constructing the unloader for the tire vulcanizer are vertically arranged in parallel. Sliders 10 . . . are movably engaged with the linear motion guide rails 9, 9 in a state where the sliders 10 apply a preload to the rails so as not to cause clearance.

Figure 5:
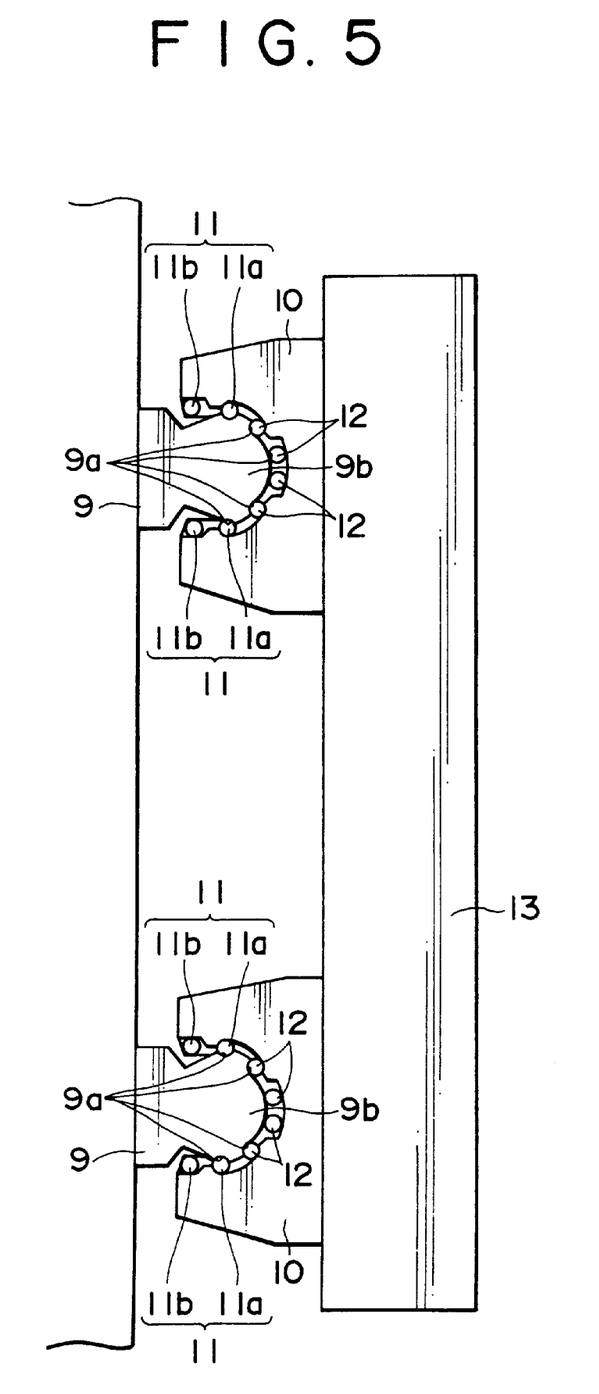
FIG. 5 is a diagram for explaining an engagement state of a linear motion guide rail and a slider.

The engagement between the linear motion guide rail 9 and the slider 10 will be specifically described. As shown in FIG. 5, four raceway grooves 9a are formed on a shoulder 9b of the linear motion guide rail 9. On the other hand, four ball rows 11 comprising load ball rows 11a and escape ball rows 11b are formed in the slider 10. The load ball rows 11a and the escape ball rows 11b of the ball rows 11 circulate bidirectionally. Each load ball row 11a rotates by itself and rolls in the raceway groove 9a of the linear motion guide rail 9, so that the slider 10 travels on the linear motion guide rail 9. The load ball rows 11a are arranged so as to surround the shoulder 9b of the linear motion guide rail 9. The slider 10 can receive loads from all of the directions.

Each of the linear motion guide rail 9 and the slider 10 has high rigidity. By forming each of the raceway grooves 9a in an R shape having almost the same diameter as a ball, a ball 12 comes into line-contact with the raceway groove 9a. Consequently, high rigidity as a whole can be obtained. Further, the linear motion guide rail 9 and the slider 10 are accurately set and formed in a unit state. A preload is applied and a back lash between the raceway groove 9a and the ball row 11 is eliminated, thereby enabling the slider 10 to be accurately moved linearly without a shake or stick slip.

The slider 10 . . . engaged with the linear motion guide rails 9 are assembled in four corners on the rear face of the main frame 1 side of a movable carriage 13 as shown in FIGS. 3 and 4. On the other hand, a plate-shaped supporting member 14 for a boom is fixed to the top face of the movable carriage 13. A cylinder rod 21a of an elevating cylinder 21 is fixed to the center on the top face of the supporting member 14 for the boom. In the elevating cylinder 21, a cylinder case 21b is fixed via a fixing member 22 to the main frame 1 so that the cylinder rod 21a is vertically moved. By moving the cylinder rod 21a, the movable carriage 13 is lifted along the linear motion guide rails 9.

Figure 6:
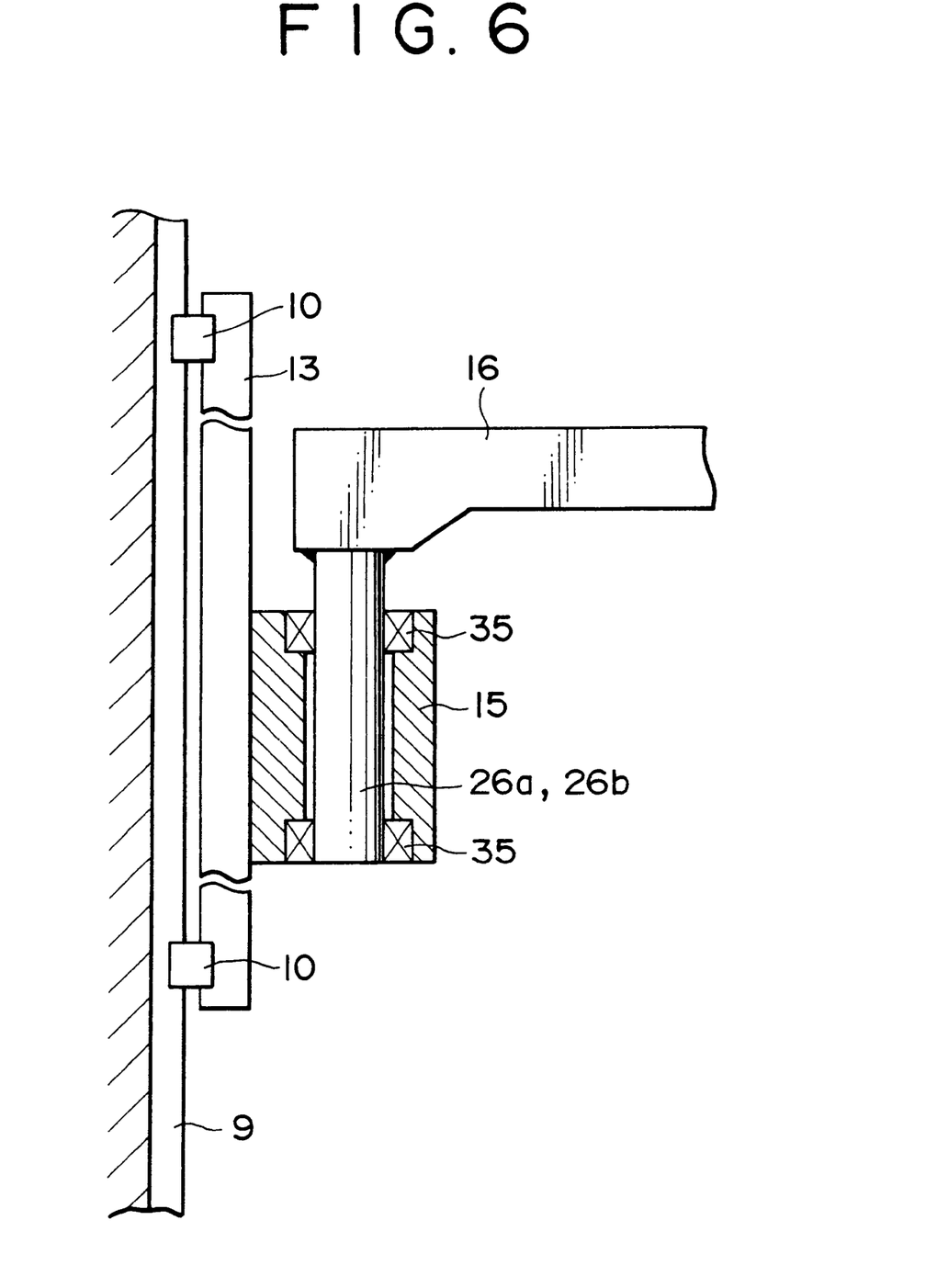
FIG. 6 is a diagram for explaining a schematic construction of a revolving suspension member.

The supporting member 14 for the boom is formed symmetrically with respect to the right and left so that both ends are positioned on sides of the main frame 1. Revolving suspension members 15, 15 each having a through hole 15a in the vertical direction are fixed to both ends of the supporting member 14 for the boom as shown in FIG. 6. Bearings 35, 35 are provided to the upper and lower ends of each of the through hole 15a. Revolving rods 26a, 26b which are fit into the bearings 35 and are supported in the vertical direction are inserted into the revolving suspension members 15, 15.

Figure 7:
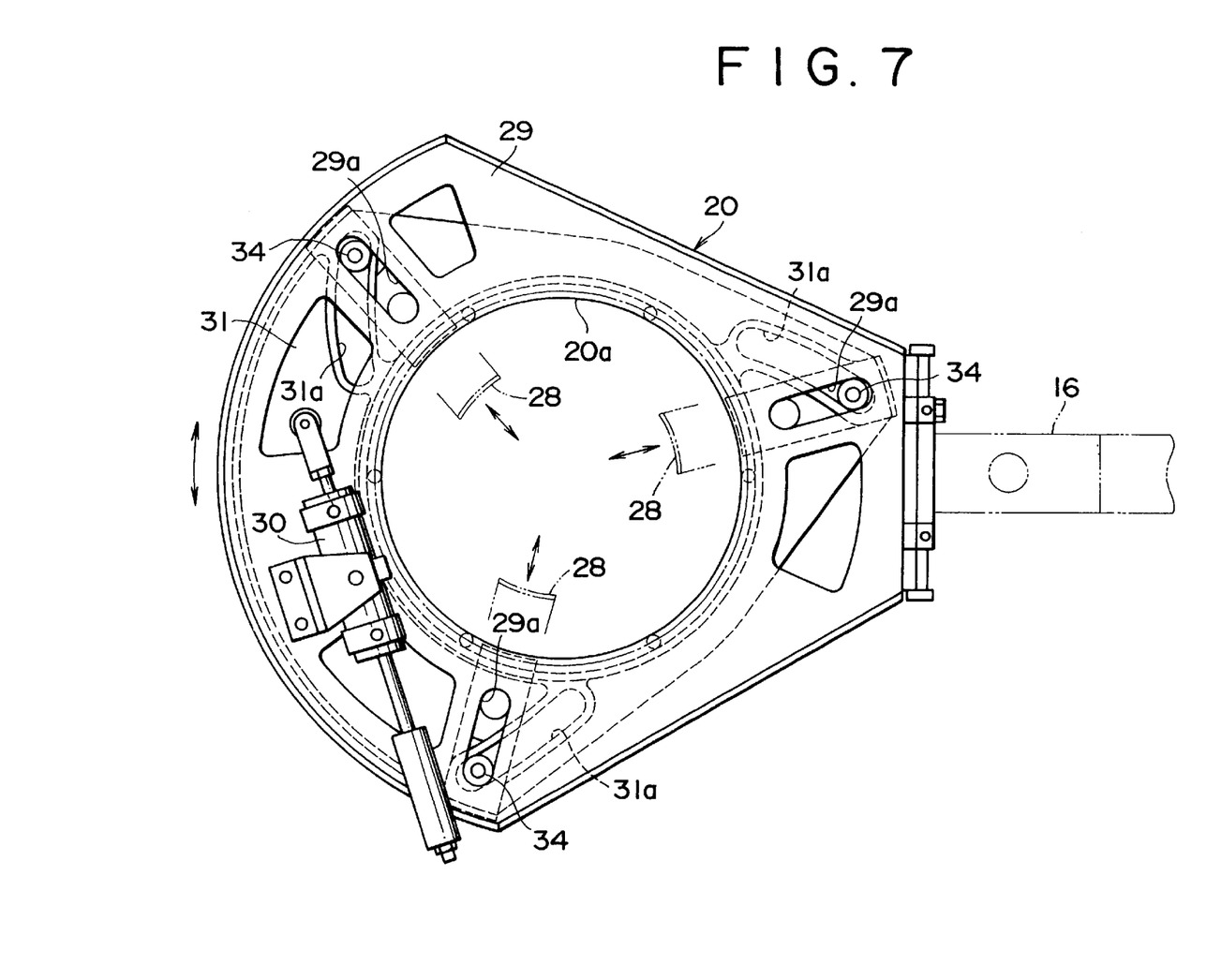
FIG. 7 is a schematic diagram of a chuck mechanism.

The revolving rods 26a, 26b are designed so that the upper ends are positioned at the same height, while the lower ends are positioned at different heights as shown in FIG. 3. One end of each of chuck booms 16, 16 is fixed to the upper end of each of the revolving rods 26a and 26b. Chuck mechanisms 20, 20 in FIG. 7 are attached to free ends of the chuck booms 16, 16. Retaining members 17, 17 are attached to the under faces of the chuck booms 16, 16. Engagement pins 18a, 18a of pin stoppers 18, 18 are fit into the retaining members 17, 17. As shown in FIG. 1, the pin stoppers 18, 18 are fixed to the revolving suspension members 15, 15 via pin stopper supporting members 19, 19 so as to be positioned between the vulcanization molding unit 6 and the PCI 8. By fitting the engagement pins 18a, 18a to the retaining members 17, 17, the chuck booms 16, 16 and the chuck mechanisms 20, 20 are fixed between the vulcanization molding unit 6 and the PCI 8 by the pin stoppers 18, 18. Consequently, works such as maintenance, check, molding exchange, and the like are facilitated.

As shown in FIGS. 3 and 4, one end of each of revolving arms 23, 23 is rotatably connected to the lower end of each of the revolving rods 26a, 26b. The other end of each of the revolving arms 23, 23 is curved so as to be positioned in front of the movable carriage 13. Cylinder rods 24a, 24a of the revolving cylinders 24, 24 are engaged with the other ends of the revolving arms 23, 23. The revolving cylinders 24, 24 are rotatably supported by cylinder supporting members 25, 25 as trunnions. The cylinder supporting members 25, 25 are provided movably in the horizontal direction for the movable carriage 13. By moving the cylinder rods 24a, 24a, the revolving cylinders 24, 24 push/pull the revolving arms 23, 23, and the chuck booms 16, 16 are turned around the revolving rods 26a, 26b as a center. The turn of the chuck boom 16 is adjusted by changing at least one of a stroke amount of the revolving cylinder 24 and an arrangement position in the horizontal direction of the cylinder supporting member 25.

Cylinder stoppers 27, 27 are attached to ends of the cylinder cases 24b, 24b of the revolving cylinders 24, 24 so as to adjust the stroke amounts of the revolving cylinders 24, 24. The positioning accuracy of the chuck mechanism 20 for the PCI 20 can be adjusted.

As shown in FIG. 7, the chuck mechanism 20 has a plurality of claw members 28 which can be retained by the bead portion of the vulcanized tire 7. The claw members 28 are provided on a chuck main body 29 having openings 29a as shown in FIG. 7. The chuck main body 29 has therein a rotating disk 31 rotated by a rotating cylinder 30 and holding rods (not shown) for holding the claw members 28 so that the claw members 28 can be moved to/from the center of the opening 29a.

In the rotating disk 31, first through holes 31a are formed in positions corresponding to the claw members 28. The first through hole 31a is formed so as to be oblique for the radial direction of the opening 29a. Each circular opening 29a is opened on the top face of the chuck main body 29 in a position corresponding to a claw member 28. Claw moving pins 34 provided for the claw members 28 are inserted into the openings 29a of the chuck main body 29 and the first through holes 31a of the rotating disk 31. Consequently, in the chuck mechanism 20, by rotating the rotating disk 31 by the rotating cylinder 30 to the directions of the arrows, the claw moving pins 34 are moved in the radial direction (directions of the arrows) of the openings 29a by the first through holes 31a of the rotating disk 31 and the openings 29a of the chuck main body 29. The claw members 28 are, therefore, moved in the radial direction.

The operation of the unloader for the tire vulcanizer with the above construction will be described.

As shown in FIGS. 1 and 2, when the vulcanization molding of the vulcanized tire 7 is finished in the vulcanization molding unit 6 of the tire vulcanizer, the chuck mechanism 20 is lifted to a predetermined position and is turned toward the vulcanization molding unit 6. When the mechanism 20 arrives at a position above the vulcanized tire 7, it is lowered to the vulcanized tire 7. The vulcanized tire 7 is then held by the chuck mechanism 20. After that, the vulcanized tire 7 is lifted with the chuck mechanism 20, turned to the PCI 8, conveyed into the PCI 8, and is air-cooled.

When the vulcanized tire 7 is conveyed from the vulcanization molding unit 6 to the PCI 8, the elevating cylinder 21 lifts the movable carriage 13, thereby lifting the chuck mechanism 20. The movable carriage 13 is engaged with the linear motion guides 9, 9 via the sliders 10 . . . The linear motion guides 9,9 are fixed to the main frame 1 to thereby have extremely high rigidity. The chuck mechanism 20 supported by the movable carriage 13 vertically moves with high positioning accuracy and holds the vulcanized tire 7 without being deviated and inclined for the vulcanized tire 7. Further, the chuck mechanism 20 lifts the vulcanized tire 7 without deviation and inclination caused by a force applied when pattern grooves of a tire tread portion of the vulcanized tire 7 are separated from the mold. Consequently, the unloader for the tire vulcanizer can unload the vulcanized tire 7 to the PCI 8 with high positioning accuracy.

According to the embodiment, the movable carriage 13 is engaged via the sliders 10 . . . with the linear motion guide rails 9, 9 which are fixed to the main frame 1 and the chuck mechanism 20 is lifted by the movable carriage 13. Consequently, the chuck mechanism 20 can be positioned with high accuracy without inclination. The unloader according to the embodiment will be specifically described by comparing with a conventional unloader for a tire vulcanizer which performs a positioning by using a guide rod as a reference.

First, the inclination (parallelism and concentricity) due to the deflection of the linear motion guide rail 9 was examined.

Figure 8:
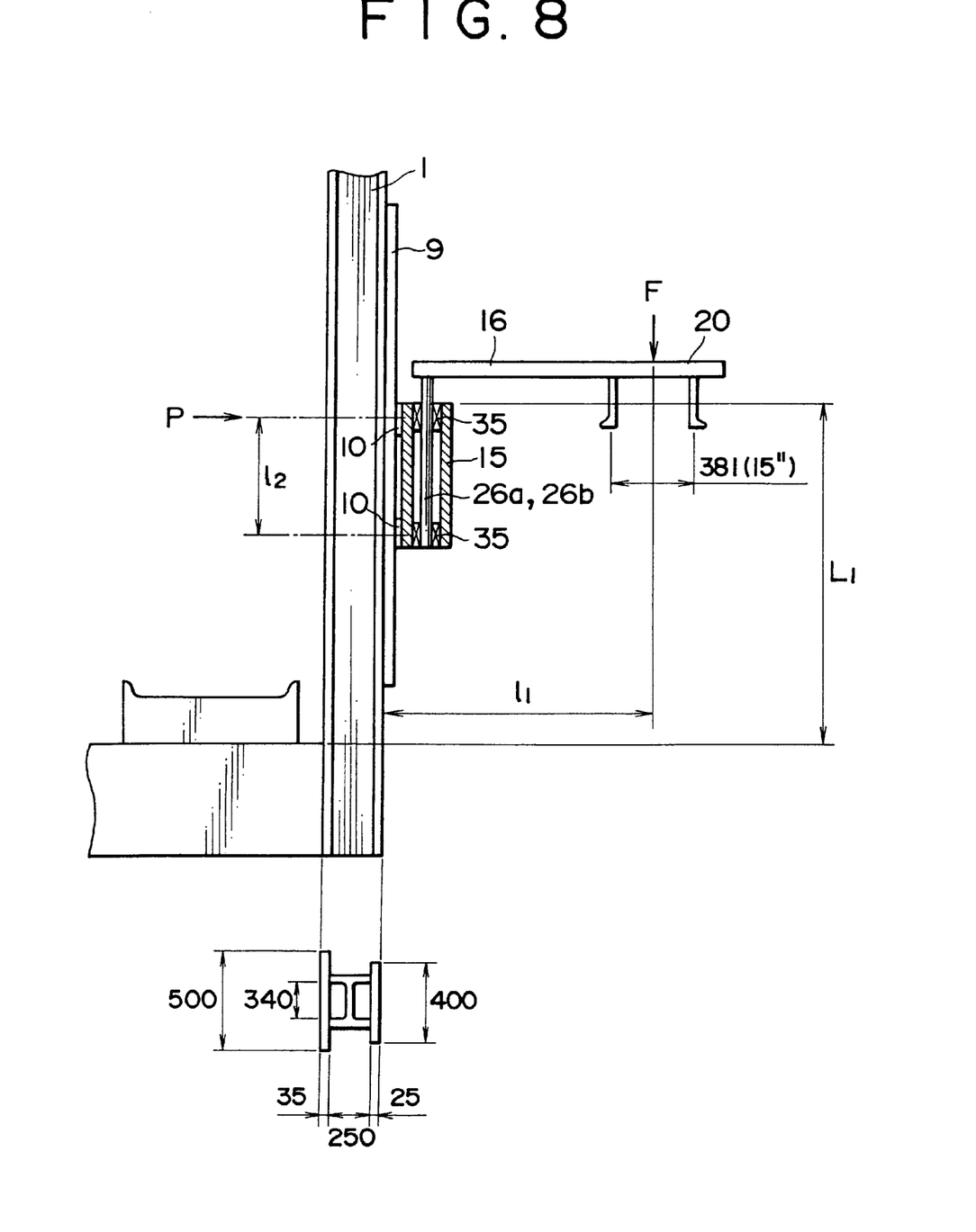
FIG. 8 is a schematic diagram of an unloader for the tire vulcanizer.

In the construction of the embodiment, as shown in FIG. 8, when it is assumed that a suspension force F=4,830 kg (weight of the vulcanized tire 7: 30 kg, a separating force from mold: 4,800 kg), $L_1$=750 mm, $l_1$=930 mm, and $l_2$=500 mm, a load P=4,830×930/500=8,984 kgf. Therefore, a deflection $\delta_{max}$=−$PL_1^8$/3EI=0.084 mm, a deflection angle $i_{max}$=−(3/2$L_1$)$\delta_{max}$=0.00017 rad=0.0097. It is found out under the conditions that the parallelism is tan 0.0097×381= 0.06 mm and the concentricity is tan 0.0097×150=0.025 mm.

Figure 9:
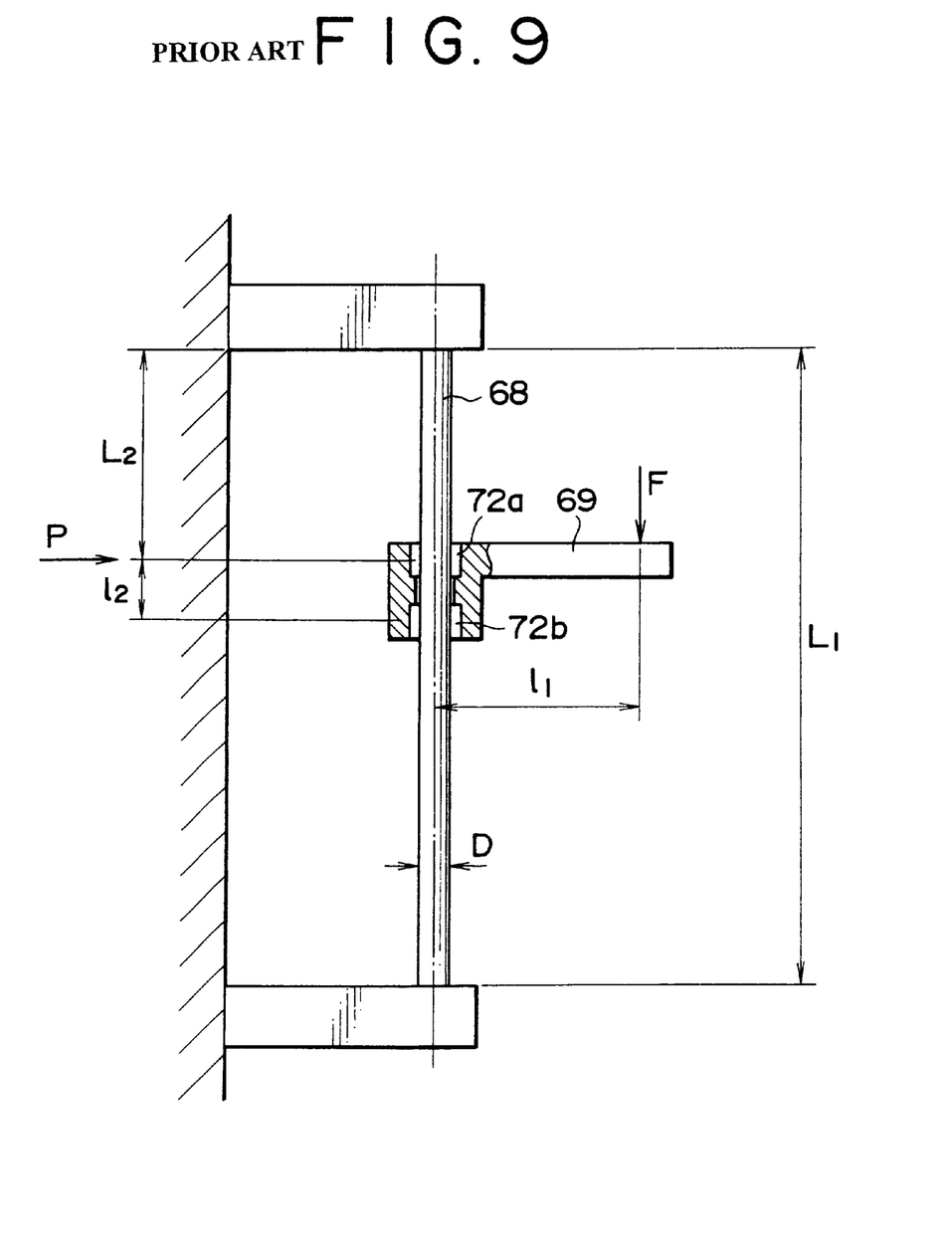
FIG. 9 is a schematic diagram of a conventional unloader for the tire vulcanizer.

On the contrary, in the conventional construction as shown in FIG. 9, when it is assumed that a suspension force F=4,830 kg (weight of the vulcanized tire 7: 30 kg, a separating force from mold: 4,800 kg), $L_1$=1,500 mm, $L_2$=750 mm, $l_1$=930 mm, $l_2$=500 mm, and D=100 mm, a load P=4,830×930/500=8,984 kgf and I=($\pi$/64)$D^4$=($\pi$/64) $100^4$=4,910,000 $mm^4$. Therefore, a deflection $\delta_{max}$=−$PL_1^8$/ 48EI=6.13 mm, a deflection angle $i_{max}$=−(3/L1)$\delta$ max= 0.01226 rad=0.7. It is found out under the conditions that the parallelism is tan 0.7×381=4.66 mm and the concentricity is tan 0.7×150=1.83 mm.

According to the construction of the embodiment, it is confirmed that the inclination (parallelism and concentricity) due to the deflection is smaller and the unloading operation to the PCI 8 can be executed with higher positioning accuracy as compared with the conventional construction.

Nextly, inclination (parallelism and concentricity) due to clearance is examined.

In the construction of the embodiment, as shown in FIG. 8, it is considered that clearance between the linear motion guide rail 9 and the slider 10 and clearance between the bearings 35, 35 and supporting rod 37 cause the inclination of the chuck mechanism 20 or the like. When those clearance is examined, the clearance between the linear motion guide rail 9 and the slider 10 is judged to be zero since the preload is applied between the linear motion guide rail 9 and the slider 10. The clearance between the bearings 35, 35 and the supporting rod 37 is 0.005 mm or less which is extremely small, so that the bearings 35, 35 and the supporting rod 37 are not worn out for a long time. Consequently, it is judged that the extremely small clearance is maintained for a long time. Thus, it is confirmed that the inclination caused by the clearance fully satisfies the accuracy of the unloader for the tire vulcanizer for a long time.

On the contrary, when the bushings 72a, 72b are fit into the guide rod 68 as in the conventional construction of FIG. 9, clearance ranging from 0.071 to 0.036 mm exists by an engagement allowance of the guide rod 68 and the bushings 72a, 72b. The parallelism and concentricity obtained from the maximum value (tan 0.071/500=0.008) of the inclined angle by the clearance are 0.05 mm and 0.02 mm, respectively. Therefore, the conventional construction satisfies the required specification. However, the guide rod 68 and the bushings 72a, 72b are worn out by a face contact and the clearance increases quickly. It is, therefore, obvious that the conventional construction cannot satisfy the accuracy of the unloader for the tire vulcanizer.

A necessary elevating force in the construction of the embodiment as shown in FIG. 8 is obtained as follows. Since a coefficient $\mu$ of friction between the linear motion guide rail 9 and the slider 10 is 0.002, the necessary elevating force of F+P$\mu$=4,830+8,984×0.002=4,848 kgf is obtained. The necessary elevating force in the conventional construction as shown in FIG. 9 is also obtained. Since the coefficient $\mu$ of friction between the guide rod 68 and the bushings 72a, 72b is 0.2, the necessary elevating force of F+P$\mu$=4,830+8,984× 0.2=6,627 kgf is obtained. Thus, the following was confirmed. According to the construction of the embodiment, the necessary elevating force is reduced more as compared with the conventional construction. The inclination caused by the elevating force is minimized and the productivity can be improved by the high-speed operation.

An impact force by inertia on the free end in the chuck boom 16 in the embodiment of FIG. 8 was examined. It is judged that the impact force is small because (1) the linear motion guide rail 9 is fixed to the main frame 1 and sufficient rigidity is obtained, (2) the clearance between the linear motion guide rail 9 and the slider 10 is zero, and (3) the clearance between the bearings 35, 35 and the supporting rod 37 is slight.

The impact force by inertia on the free end of the conventional chuck boom 69 was also examined. It is judged that the impact force is larger than that of the construction of the embodiment due to (1) insufficient rigidity of the guide rod 68 and (2) the large clearance between the guide rod 68 and the bushings 72a, 72b. Thus, it was confirmed that since the impact force by inertia on the free end in the construction of the embodiment is smaller than that in the conventional construction, the deviation or the like of the chuck mechanism 20 due to the impact force can be prevented.

Although the case where the invention is applied to the unloader for the tire vulcanizer in a twin type in which one main frame 1 is provided for the vulcanization molding units 6, 6 which are provided on the right and left sides as shown in FIG. 1 has been described in the embodiment, the invention is not limited to this type. The invention can be also applied to the unloader of an individual type in which main frames 1 are provided to the vulcanization molding units 6, respectively, and further, applied to a vertical loader.

According to the invention as mentioned above, by vertically and horizontally moving the chuck mechanism, the vulcanized tire is held by the chuck mechanism and unloaded from the tire vulcanizer to the post-cure inflator, and is positioned in a predetermined position in the post-cure inflator. The unloader comprises: the linear motion guide rail vertically fixed to the main frame of the tire vulcanizer; the slider movably fixed to the linear motion guide rail; the movable carriage having the slider so as to elevate along the linear motion guide rail; the revolving suspension member having a revolving rod provided on the movable carriage and is vertically supported by the bearings; and the chuck boom which is attached to the revolving rod so as to be turnable in the horizontal direction and supports the chuck mechanism.

The linear motion guide rail is fixed to the main frame and has consequently high rigidity. Even when the chuck mechanism is elevated and a large force is applied from the slider so as to deflect the linear motion guide rail, the linear motion guide rail is hardly deflected. No clearance occurs between the linear motion guide rail and the slider and the clearance between the revolving rod and the bearing is extremely small. Therefore, the inclination of the chuck mechanism and the chuck boom due to the deflection and clearance is extremely reduced and the vulcanized tire can be unloaded with high positioning accuracy. Since the coefficient of friction of the bearing is very small, the clearance between the revolving rod and the bearing is not increased by abrasion, so that the high positioning accuracy can be maintained for a long time. Further, the linear motion guide rail is fixed to the main frame and no space exists between the linear motion guide rail and the main frame, the interval between the main frame and the post-cure inflator is reduced and there is an effect such that the whole tire vulcanizer can be miniaturized.

According to the invention, the chuck boom can be also fixed between the tire vulcanizer and the post-cure inflator.

Since the chuck boom and the chuck mechanism can be fixed between the tire vulcanizer and the post-cure inflator, there is an effect such that the maintenance, check and exchanging work of the mold can be easily performed.

According to the invention, it is also possible to construct in a manner such that the revolving arm is connected onto the chuck boom via the supporting rod and the revolving arm is pushed and pulled by the actuator for revolving which is provided on the movable carriage, thereby turning the chuck boom.

Since one elevating base has two right and left elevating mechanisms and the revolving mechanisms, there is an effect such that the unloader for the tire vulcanizer can be compactly constructed.

According to the invention, the turn of the chuck boom can be adjusted by changing the moving amount in the horizontal direction of the actuator for the movable carriage and/or the stroke amount of the actuator.

Consequently, there is an effect such that the turn of the chuck boom can be easily adjusted by changing the horizontal movement amount of the actuator for the movable carriage and/or the stroke amount of the actuator.

What is claimed is:

1. An unloader in a tire vulcanizer, comprising:

right and left side chuck mechanisms;

a linear motion guide rail which is fixed along its length to a main frame of the tire vulcanizer and has a plurality of raceway grooves;

a slider in which balls rolling on the raceway grooves of the linear motion guide rail are assembled and are movably engaged with the linear motion guide rail so as to move along the length of the linear motion guide rail;

a movable carriage supported by the slider so as to move along the linear motion guide rail;

an elevating cylinder connected between the movable carriage and the main frame which elevates the movable carriage along the linear motion guide rail;

a supporting member for a boom, the supporting member being fixed to the movable carriage;

right and left side revolving suspension members provided at right and left sides of said supporting member, each said revolving suspension member having a revolving rod vertically supported by a bearing, the revolving suspension member being fixed to the supporting member;

right and left side chuck booms attached to respective ones of said revolving rods so as to be turnable in the horizontal direction and support the respective right and left side chuck mechanisms; and right and left side revolving actuators connected to respective ones of the right and left side chuck booms which independently turn the respective right and left side chuck booms around the center of the respective right and left side revolving rods, the revolving actuators being provided on the movable carriage.

2. An unloader in a tire vulcanizer, comprising:

right and left side chuck mechanisms;

a linear motion guide rail which is fixed along its length to a main frame of the tire vulcanizer and has a plurality of raceway grooves;

a slider in which balls rolling on the raceway grooves of the linear motion guide rail are assembled and are movably engaged with the linear motion guide rail so as to move along the length of the linear motion guide rail;

a movable carriage supported by the slider so as to move along the linear motion guide rail;

an elevating cylinder connected between the movable carriage and the main frame which elevates the movable carriage along the linear motion guide rail;

a supporting member for a boom, the supporting member being fixed to the movable carriage;

right and left side revolving suspension members provided at right and left sides of said supporting member, each said revolving suspension member having a revolving rod vertically supported by a bearing, the revolving suspension member being fixed to the supporting member;

right and left side chuck booms attached to respective ones of said revolving rods so as to be turnable in the horizontal direction and support the respective right and left side chuck mechanisms; and right and left side revolving actuators connected to respective ones of the right and left side chuck booms comprising means for independently turning the respective right and left side chuck booms around the center of the respective right and left side revolving rods, the revolving actuators being provided on the movable carriage.

3. An unloader in a tire vulcanizer, comprising:

right and left side chuck mechanisms;

a linear motion guide rail which is fixed along its length to a main frame of the tire vulcanizer and has a plurality of raceway grooves;

a slider in which balls rolling on the raceway grooves of the linear motion guide rail are assembled and are movably engaged with the linear motion guide rail so as to move along the length of the linear motion guide rail;

a movable carriage supported by the slider so as to move along the linear motion guide rail;

an elevating cylinder connected between the movable carriage and the main frame which elevates the movable carriage along the linear motion guide rail;

a supporting member for a boom, the supporting member being fixed to the movable carriage;

right and left side revolving suspension members provided at right and left sides of said supporting member, each said revolving suspension member having a revolving rod vertically supported by a bearing, the revolving suspension member being fixed to the supporting member;

right and left side chuck booms attached to respective ones of said revolving rods so as to be turnable in the horizontal direction and support the respective right and left side chuck mechanisms; and right and left side revolving actuators which independently turn the respective right and left side chuck booms around the center of the respective right and left side revolving rods, the revolving actuators being provided between respective ones of the right and left side chuck booms and the movable carriage.

4. An unloader in a tire vulcanizer, comprising:

right and left side chuck mechanisms;

a linear motion guide rail which is fixed along its length to a main frame of the tire vulcanizer and has a plurality of raceway grooves;

a slider in which balls rolling on the raceway grooves of the linear motion guide rail are assembled and are movably engaged with the linear motion guide rail so as to move along the length of the linear motion guide rail;

a movable carriage supported by the slider so as to move along the linear motion guide rail;

an elevating cylinder connected between the movable carriage and the main frame which elevates the movable carriage along the linear motion guide rail;

a supporting member for a boom, the supporting member being fixed to the movable carriage;

right and left side revolving suspension members provided at right and left sides of said supporting member, each said revolving suspension member having a revolving rod vertically supported by a bearing, the revolving suspension member being fixed to the supporting member;

right and left side chuck booms attached to respective ones of said revolving rods so as to be turnable in the horizontal direction and support the respective right and left side chuck mechanisms; and right and left side revolving actuators comprising means for independently turning the respective right and left side chuck booms around the center of the respective right and left side revolving rods, the revolving actuators being provided between respective ones of the right and left side chuck booms and the movable carriage.

* * * * *